United States Patent [19]

Monk

[11] 4,408,628

[45] Oct. 11, 1983

[54] SYSTEM AND METHOD FOR REPAIR OF LEAKING STORAGE TANKS CONTAINING FLUIDS WHICH CONTAMINATE GROUND WATER

[76] Inventor: Robert J. Monk, Eng. Div. HQ-AAFES-EUR, APO New York, N.Y. 09245

[21] Appl. No.: 344,207

[22] Filed: Jan. 29, 1982

[51] Int. Cl.³ .......... F16K 23/00

[52] U.S. Cl. .......... 137/312; 137/584; 137/587; 220/85 B; 73/49.2

[58] Field of Search .......... 220/441, 442, 460, 461, 220/85 B; 73/45 R, 49.2; 137/583, 587, 584, 312, 375

[56] References Cited

U.S. PATENT DOCUMENTS

| | | | |
|---|---|---|---|
| 3,028,040 | 4/1962 | Woodward et al. | 220/85 B |
| 3,110,157 | 11/1963 | Radd | 137/312 |
| 3,252,155 | 5/1966 | Surtees et al. | 73/40 R |
| 3,712,500 | 1/1973 | Marchay | 220/442 |
| 3,724,712 | 4/1973 | Starr et al. | 220/461 |
| 3,780,900 | 12/1973 | Yamamoto | 220/901 |
| 3,906,880 | 9/1975 | Hebert | 220/85 B |
| 4,210,254 | 7/1980 | Parsons et al. | 220/85 B |

*Primary Examiner*—A. Michael Chambers

[57] ABSTRACT

A system and method for repair of leaking storage tanks containing fluids which contaminate ground water has been devised requiring reduced funding which will make it economically feasible for repair of all old tanks suspected of being potential leakers, thereby protecting the public and environment from future severe hazards.

All internal appurtenances are removed from the tank before it is gas freed and fitted with a new combination manway and appurtenances access. All tank openings originally utilized by appurtenances are plugged liquid tight except for the tank vent system. A flexible fluid tight containment means is formed to the tank interior shape and contains an opening edge which is assembled as a fluid tight gasket seal between the flange cover of the new access. All internal appurtenances are relocated to extend through the new access. A support cage bears against the inside of the containment means adjacent to the access to relieve strain on the containment means when the fluid storage level is low and to isolate the appurtenances from the containment means. A sampling means is installed between the outside of the containment means and low points of the tank interior for detection and removal of ground water leaking into the tank and for detecting any fluid leak through the containment means. The effective area covered by the sampling means is increased by the addition of corrugated spacers between the containment means and the lower third of the tank which is most subject to leaks. The containment means has the additional positive feature of eliminating all fluid vapor losses from the stored liquid vapor interface which presently travel out through the tank vent system; and, it eliminates the entrance of air into the containment means vapor space which has been the cause of past explosions due to presence of a combustible vapor/air mixtures.

6 Claims, 6 Drawing Figures

SYSTEM AND METHOD FOR REPAIR OF LEAKING STORAGE TANKS CONTAINING FLUIDS WHICH CONTAMINATE GROUND WATER

BACKGROUND

Thousands of tanks are presently in service world-wide for storage of ground water contaminating fluids. Older varieties of these tanks fabricated of steel and unprotected cathodically are subject to internal and external corrosion which will eventually cause leaking of the stored fluid or admittance of ground water into the tank. The rate of corrosion depends on the corrosiveness of the tank support structure or the contained fluid and the tank surface protective coatings. Leakage of these fluids into the ground water constitutes an extreme hazard to the public and environment; and, leakage of ground water into the tank adversely affects the quality of the stored fluid.

Here-to-fore leaking tanks have been replaced with new tanks, repaired in place or abandoned. The cost of replacing all old tanks with new tanks at one time would impose such an economic burden on many operators that they could not remain in business; therefore, tanks are usually replaced only when leaks are detected and many times this detection is made only after considerable contamination has already taken place. Fiberglass epoxy lining materials have been rejected according to information received on rules of the current Uniform Fire Code. Additionally, this in-place repair method cannot be considered a permanent solution since the tank will continue to corrode and there is no positive means to determine that the coating has not developed leaks. Abandonment of leaking tanks results in loss of storage capacity which can only be considered where other adequate storage is available.

SUMMARY OF THE INVENTION

I have devised a system and method for repair of leaking storage tanks containing fluids which contaminate ground water. The tank is made ready for installing my system by first removing all appurtenances from the tank except its external vent system and by gas freeing the tank. Subsequent to gas freeing the tank it is fitted with a new combination manway and appurtenances access and all tank screwed openings which originally contained the appurtenances are plugged liquid tight. A flexible fluid light containment means formed to the tank interior shape is positioned in place with its opening edge forming a fluid tight gasket seal between the flange and cover of the tank's new access. A support cage is installed within the containment means in the space around the tank's new access to relieve the strain on the opening edge of the containment means when the contained fuel level is low and the containment means is not fully inflated. The support cage additionally keeps the containment means away from the space occupied by appurtenances which extend down inside the containment means directly under their new connection points within the tank's new access. A sampling means is installed between the containment means and the lowest inside tank surface for detection and removal of any ground water leaks into the tank and to detect possible leakage of contained fluid through the containment means.

The primary object of this invention is to provide an economical method for repair of leaking storage tanks in order that the public and environment may be readily protected from the hazards associated with leakage of many fluid types into the ground water and subsequent fluid evaporation into the atmosphere.

Additional benefits of this invention is the complete elimination of fluid vapor expulsion into the atmosphere and the complete elimination of atmosphere contact with the fluid/fluid vapor interface which can develop explosive fluid vapor atmospheric mixtures.

DESCRIPTION OF A PREFERRED EMBODIMENT

Figure 1:
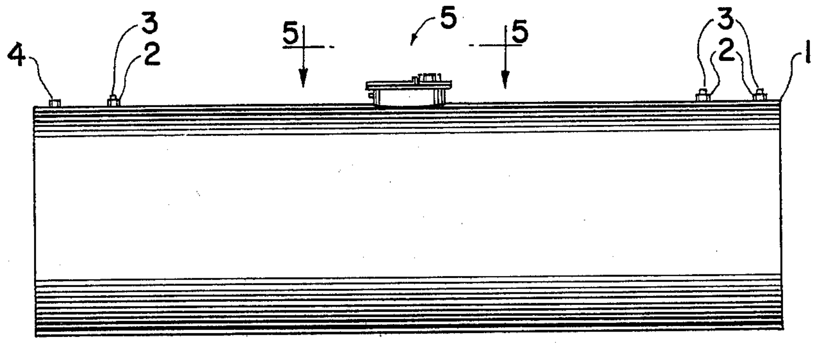
FIG. 1 is a side view of a typical tank with all appurtenances and the support structure removed for clarity.
Figure 2:
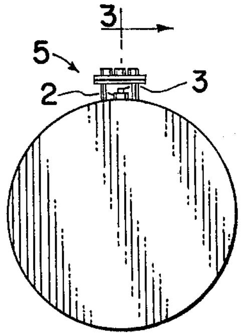
FIG. 2 is an end view thereof.
Figure 3:
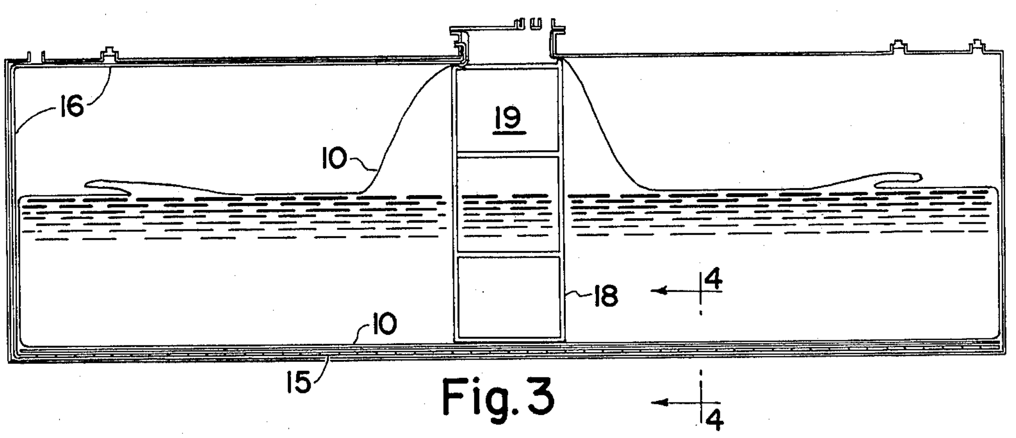
FIG. 3 is an enlarged vertical cross-section taken through the tank center as indicated in FIG. 2.
Figure 5:
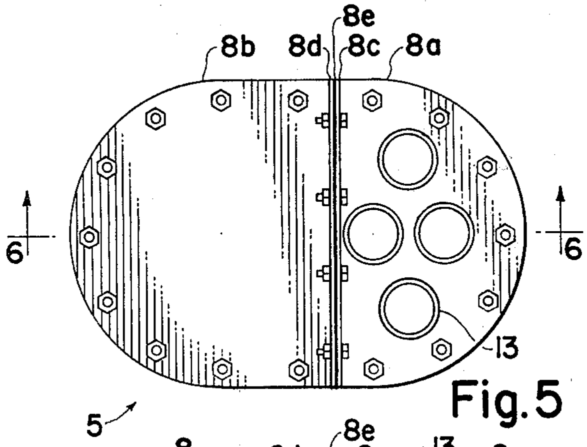
FIG. 5 is an enlarged view of the manway and appurtenances access as indicated in FIG. 1; and, FIG. 6 is a section taken through the manway and appurtenances access as indicated in FIG. 5.
Figure 4:
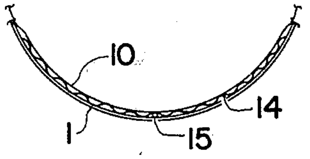
FIG. 4 is a partial vertical cross-section taken at a right angle to the tanks' longitudinal axis as indicated in FIG. 3.
Figure 6:
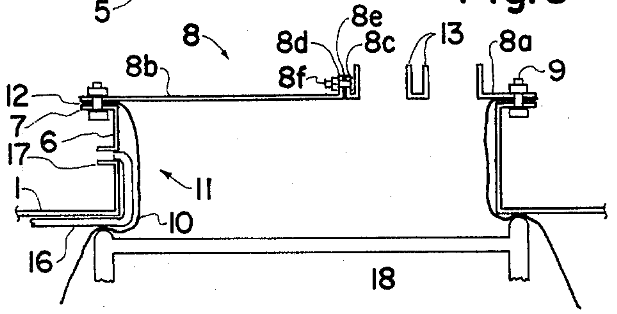

Referring to FIG. 1 and 2, tank 1 contains screw type openings 2 into which existing appurtenances are inserted such as fill tubes, submerged pumps, suction pipes for suction pumps, syphon lines, fluid level gauging systems, vapor return lines and venting systems. Utilizing my method for tank repairs all appurtenances except the venting system will be relocated and openings 2 will be closed fluid tight with plugs 3. The complete existing venting system installed external to the tank remains connected fluid tight to its existing opening 4. Any existing vapor return line connected into the existing tank venting system requires reconnection into the new tank vapor return lines under my method for tank repair. Support structure for tank 1 normally comprises surrounding backfill sand/gravel material up to a level approximately three feet above the tank top. Included in this three foot thickness there is usually an existing surface slab of asphalt or concrete into which framed openings with covers are cast for access to the appurtenances. Utilizing my method for tank repairs temporary sand/gravel retainer rings are required until appurtenances are removed, the tank is gas freed, tank openings are plugged and the under slab void is filled with sand. Then the temporary retainer ring can be removed, the surface opening can be closed and a permanent sand/gravel retainer ring will be required for installation of the new manway and appurtenances access 5. Other slab/fill removal/replacement may be required to reroute piping and electrical system due to relocation of appurtenances. Referring to FIG. 6, access 5 contains side walls 6 joined fluid tight with tank 1 and flange 7. Cover 8 is shaped to close over the entire manway and appurtenances access opening including flange 7. Contact areas common to flange 7 and cover 8 are to be machined smooth for maintaining a fluid tight seal when assembled. Multiple bolts, with washers 9 are inserted in multiple holes drilled through flange 7 and cover 8 for assembly. Referring to FIG. 3 and 6, flexible fluid tight containment means 10 is fabricated of material inert to the stored fluid and formed to the tank interior shape. Containment means 10 is available from Flexi-Liner Corporation, P.O. Box 767, Pasadena, Calif. 91101. Opening edge 11 fabricated of the same material as containment means 10 is formed to the interior of access 5 including a sealing flange 12 which acts as a gasket between flange 7 and cover 8 when sealing flange 12 is punched with holes aligning with bolts 9 and when flange 7, sealing flange 12 and cover 8 are assembled together with bolts, nuts with washers 9. All parts of containment means 10, opening edge 11 and sealing flange 12 are joined together fluid tight. Referring to FIG. 5 and 6, screw type openings 13 joined fluid tight with cover part *8a* are utilized for relocated appurtenances. Cover part *8b*, utilized for manway access without removal of appurtenances, is joined together fluid tight with cover part *8a* by cover flange *8c* and *8d*, gaskets *8e* and bolts/nuts/washers *8f*. Referring to FIG. 4, corrugated material 14 is brought through access 5 in coils, cut to length to cover 120 degrees across the tank bottom, lapped at joints and secured to the tank bottom with no edges which would puncture containment means 10. Corrugated material 14 allows any leaking ground water penetration or leaking stored fluid to seek the lowest level within tank 1 where a sampling means 15 is positioned. Sampling means 15 is joined fluid tight with leaked fluid/ground water suction line 16 which is routed between tank 1 and containment means 10 for connecting to a threaded coupling 17 which is installed fluid tight through side wall 6. Outside end of coupling 17 is to be connected with a flexible hose and quick coupler in order to periodically extract samples from sampling means 15 or for removal of any ground water which has leaked into the tank. Since there may be some residual fluid within the sand/gravel around the tank due to past leaks or spills at the fill connection, samples may indicate a slight presence of fluid; therefore, the frequency of sample taking should consider any change in fluid concentration. A dramatic increase in fluid concentration with a fairly constant level in ground water table will indicate fluid leakage through containment means 10. Referring to FIG. 3, cage 18 is brought through access 5 disassembled. Cage 18 is assembled and adjusted to force containment means 10 tight against the inside of tank 1 whereby all stress is relieved on opening edge 11 when stored fluid level is low and containment means 10 is draped down from cage 18 as indicated. Cage 18 additionally prevents containment means 10 from entering the space 19 occupied by the relocated appurtenances. Cage 18 is fitted with latchable personnel access gates in each circular and face whereby personnel may inspect gas free containment means 10 and inspect its inside surface when any leak is detected.

Having described my invention, I claim:

1. A system and method for repair of leaking storage tanks containing fluids which contaminate ground water comprises:

a flexible fluid tight containment means formed to the interior shape of said tank whereby fluid is stored with zero leakage inside the tank, said tank restrains said containment means from movement beyond its fully inflated size preventing overstressing;

an opening edge jointed fluid tight to said containment means and formed to the inside shape of a combination manway and appurtenances access whereby a fluid tight seal is formed with said tank when said edge is assembled as a gasket between the flange and cover of said access, said access is an integral part of said tank;

a support cage assembly inside said containment means adjacent to said access holds said containment means tight against said tank whereby strain on said opening edge is relieved when fluid storage level is low and said containment means is not fully inflated and whereby said containment means is maintained separated from said appurtenances installed inside said tank through said access;

a sampling means located between the lowest positions of said tank interior and the outside of said containment means with said sampling means being joined fluid tight with a pump which discharges into a sealed reservoir whereby leaking ground water or stored fluid can be observed and removed; and, multiple corrugated spacers installed between the bottom of said containment means and bottom interior of said tank and said sampling means whereby the effective area of said sampling is increased to cover most probable tank leakage areas.

2. The combination called for in claim 1 wherein flexible fluid tight containment means comprises: multiple elements of thin flexible material joined together fluid tight and being of material inert to the stored fluid whereby fluid tightness and longevity are assured, said containment mean is to be capable of being folded into a small bundle for insertion through said access as required before final positioning and fastening to said access by said opening edge.

3. The combination called for in claim 1 wherein support cage comprises:

multiple components which after assembly inside said containment means form said cage for forcing said containment means tight against said tank interior in the area adjacent to said access whereby stress on the opening edge of said containment means is reduced and whereby said appurtenances extending down inside said cage are held separated from said containment means, said multiple components are sized to allow transport through said access while unassembled.

4. The combination called for in claim 3 wherein multiple components additionally comprise:

a latchable personnel access door within each end face of said cage facing toward ends of said tank whereby the inside of said containment means may be visually inspected for tears after removal of said fluid and after the interior of said containment means has been gas freed.

5. The combination called for in claim 1 wherein sampling means comprises:

a perforated tube of small cross sectional area and length to match the tank's lowest interior longitudinal surface length whereby an initial leakage of fluid or ground water will fully fill said perforated tube, one end of said perforated tube is to be closed fluid tight.

a closed tube of small cross sectional area joined fluid tight with open end of said perforated tube and extending from said perforated tube up to a dry break disconnect accessible through a manhole at the surface whereby said leaked fluid or ground water is withdrawn from said perforated tube; and, a portable suction pump and fluid tight reservoir joined fluid tight with said quick disconnect whereby periodic testing can be performed to detect and remove any leaked fluid or ground water.

6. The combination called for in claim 1 wherein multiple corrugated spacers comprise:

multiple corrugated sections inert to said fluid and ground water with no sharp edges contacting said containment means and rigidly joined to interior bottom third of cylindrically shaped surface of said tank whereby said containment means has adequate support to prevent tears while allowing any leakage to penetrate through side and end joints between said sections before draining into said sampling means, said sections are sized to allow transport through said access while unassembled.

* * * * *